United States Patent [19]
Crane et al.

[11] Patent Number: 5,180,604
[45] Date of Patent: * Jan. 19, 1993

[54] NON-FAT CREAM CHEESE PRODUCT AND METHOD FOR MANUFACTURE THEREOF

[75] Inventors: Lori A. Crane, Buffalo Grove; John T. Hynes, Glenview; Jules H. Guth, Mount Prospect; John J. Strandholm, Morton Grove, all of Ill.

[73] Assignee: Kraft General Foods, Inc., Northfield, Ill.

[*] Notice: The portion of the term of this patent subsequent to Jan. 7, 2009 has been disclaimed.

[21] Appl. No.: 737,664

[22] Filed: Jul. 30, 1991

[51] Int. Cl.$^5$ ............................................ A23C 19/076
[52] U.S. Cl. ................................. 426/582; 426/330.2; 426/511; 426/588
[58] Field of Search .............. 426/582, 511, 588, 330.2

[56] References Cited

U.S. PATENT DOCUMENTS

| | | | |
|---|---|---|---|
| 3,741,774 | 6/1973 | Burwall, Jr. | 426/582 |
| 3,929,892 | 12/1975 | Hynes et al. | 426/582 |
| 4,112,131 | 9/1978 | Bosy et al. | 426/511 |
| 4,244,983 | 1/1981 | Baker | 426/582 |
| 5,079,024 | 1/1992 | Crane | 426/582 |
| 5,108,773 | 4/1992 | Smith et al. | 426/582 |

Primary Examiner—Jeanette Hunter
Assistant Examiner—Helen Pratt
Attorney, Agent, or Firm—Fitch, Even, Tabin & Flannery

[57] ABSTRACT

A fermented skim milk retentate is introduced into a mixing tank provided with agitation means. The skim milk retentate is agitated and transferred through a recirculating loop as dry cottage cheese curd and an emulsifying salt are added to the mixing tank. Agitation and recirculation are continued for a period of time sufficient to provide a dispersion of the dry cottage cheese curd and emulsifying salt homogeneously throughout the retentate. Heating of the dispersion is then started by injecting steam into the dispersion as it passes through the recirculating loop. While the temperature of the dispersion is within the range of from about 70° F. to about 150° F., non-fat dry milk is added to the dispersion. Agitation and heating is continued until the dispersion temperature is within the range of from about 140° F. to about 165° F. Xanthan gum, as the first gum of a stabilizing system, is then added to the mixing tank. Agitation and heating is continued until the dispersion temperature is in the range of from about 165° F. to about 190° F. The steam is shut off and salt, sugar and carrageenan, as the second gum of a stabilizer system, are added to the mixing tank. Agitation is continued for a period of from about 1 to about 4 minutes to provide a non-fat cream cheese mix. The cream cheese mix is then homogenized to provide a non-fat cream cheese product.

4 Claims, No Drawings

NON-FAT CREAM CHEESE PRODUCT AND METHOD FOR MANUFACTURE THEREOF

FIELD OF THE INVENTION

The present invention is directed to a non-fat cream cheese product and to a method for manufacture thereof. Generally, the method includes the steps of combining a cultured skim milk retentate, dry curd cottage cheese and non-fat dry milk with an emulsifying salt, and a gum system in a series of steps to produce a non-fat cream cheese product that resembles a reduced fat or full fat cream cheese in texture, taste and mouthfeel.

BACKGROUND OF THE INVENTION

Cream cheese is a soft, mild acid-coagulated uncured cheese made of cream from a mixture of cream and milk. Cream cheese is stored under refrigeration conditions and the body of cream cheese is smooth and butter-like. The texture and body of cream cheese at refrigeration temperatures is such that the cream cheese can be sliced and spread. In making cream cheese, sweet whole milk and/or skim milk and sweet cream are blended in pre-selected proportions to form a cream cheese mix. The cream cheese mix normally has a butterfat content of from about 10% to about 14%. After processing, the finished cream cheese has a butterfat content of from about 33% to about 35% by weight.

The cream cheese mix is pasteurized and homogenized after which it is cooled, usually to a temperature between 62° F. and 92° F. and is then inoculated with a lactic acid culture. Rennet may be used to aid the coagulation of the mix. The mix is held at the inoculation temperature until it has ripened and a coagulum is formed. The acidity of the coagulum is from about 0.6% to about 0.9% (calculated as percent equivalent lactic acid).

After the desired acidity is obtained, the curd is separated from the whey and is thereafter packaged. One well known process for making cream cheese and separating cream cheese curd from whey includes a mechanical separation of the curd. This process is disclosed in U.S. Pat. No. 2,387,276 to Link. In accordance with the method of the Link patent, after the mix is ripened to form a coagulum, the coagulum is heated to an elevated temperature to break the viscosity of the mix. Thereafter, the heated mix is centrifuged at the elevated temperature to separate the curd from the whey.

There has been considerable technical efforts directed to providing a cream cheese type product which has the texture, smoothness and organoleptic properties of cream cheese, but with reduced levels of fat. With increasing consumer awareness, the focal point is on reducing fat and calorie consumption. Low fat, low calorie foods which look and taste similar to their full fat, higher calorie counterparts are eagerly sought by the consumer. Researchers in the food industry have concentrated on developing food products which are nutritious and palatable, containing substantially reduced levels of high calorie fat containing ingredients. This is particularly true in the dairy industry where low calorie, low-fat products such as skim milk, yogurt and reduced fat ice cream have been successfully marketed.

The high fat levels in some dairy products, such as cream cheese which has a fat content of at least about 33%, have been thought to be necessary to maintain a desirable creamy mouthfeel and to avoid the grainy texture associated with prior attempts at producing low fat cream cheese products.

Many efforts have been made to develop imitation cream cheese products which contain reduced fat levels. Examples of such efforts are disclosed in U.S. Pat. No. 2,161,159 to Lundstedt, et al. and U.S. Pat. No. 3,929,892 to Hynes, et al. However, the fat content of the cream cheese products produced by the methods of these patents still exceeds about 10% fat. It would be desirable to reduce the fat content well below 10%. In particular, it would be highly desirable to provide a non-fat cream cheese product.

More recently, methods have been developed for making very low butterfat content imitation cream cheese products having low calorie contents which are intended for diet conscious consumers. U.S. Pat. No. 4,244,983 to Baker and U.S. Pat. 4,379,175 to Baker disclose imitation cream cheese products and a method for their manufacture having butterfat content of less than about 5%, preferably less than about 2% and which have about 60 calories per serving. However, as admitted by the inventor of these patents, in U.S. Pat. 4,724,152 to Baker, that, while the very low butterfat content of these products is desirable, the products do not closely duplicate the creamy and full-bodied consistency of full fat cream cheese.

U.S. Pat. No. 4,724,152 to Baker describes a method for making a low fat cream cheese product. The method includes the steps of admixing milk, a fat containing carrier and non-fat dry milk solids to form a dressing mixture. The dressing mixture is pasteurized and homogenized and is thereafter heated to a temperature in the range of from about 145° to about 195° F., preferably 165° to 190° F., with constant agitation. A stabilizer is admixed into the mixture. Thereafter, while maintaining the temperature of the mixture in a range of 150° to 175° F., soft unripened cultured cheese curd, such as cottage or baker's cheese curd is added to the stabilizer-containing dressing mix. The admixture is pumped to a homogenizer where it is homogenized under conventional elevated pressure conditions of 500 to 5000 psig, preferably 1500 to 3000 psig. Following homogenization, the imitation cream cheese product, at temperatures of at least 40° F., is packaged into convenient packages.

While the '152 Baker patent provides a cream cheese product with reduced fat, i.e., a fat level in the range of 2 to 9% by weight, the Baker patent does not provide a non-fat cream cheese product.

Accordingly, it is a principal object of the present invention to provide a non-fat cream cheese type product, having the appearance, taste, consistency and texture of fat-containing cream cheese.

It is another object to provide a method for making an imitation cream cheese product which has substantially no fat and which is adapted to large scale commercial operations.

These and other objects of the invention will become more apparent from the following detailed description.

SUMMARY OF THE INVENTION

In the method of the present invention for making a non-fat cream cheese product, a fermented skim milk retentate is introduced into a mixing tank provided with agitation means. The skim milk retentate is agitated and transferred through a recirculating loop as dry cottage cheese curd and an emulsifying salt are added to the mixing tank. Agitation and recirculation are continued for a period of time sufficient to provide a dispersion of the dry cottage cheese curd and emulsifying salt homogeneously throughout the retentate. Heating of the dispersion is then started by injecting steam into the dispersion as it passes through the recirculating loop. While the temperature of the dispersion is within the range of from about 70° F. to about 150° F., non-fat dry milk is added to the dispersion. Agitation and heating is continued until the dispersion temperature is within the range of from about 140° F. to about 165° F. Xanthan gum, as the first gum of a stabilizing system is then added to the mixing tank. Agitation and heating is continued until the dispersion temperature is in the range of from about 165° F. to about 190° F. The steam is shut off and salt, sugar and carrageenan, as the second gum of a stabilizer system, are added to the mixing tank. Agitation is continued for a period of from about 1 to about 4 minutes to provide a non-fat cream cheese mix. The cream cheese mix is then homogenized to provide a non-fat cream cheese product.

DETAILED DESCRIPTION OF THE INVENTION

Generally, in accordance with the invention, a protein base is provided from three separate concentrated skim milk sources, these being skim milk retentate, dry cottage cheese curd and non-fat dry milk solids. The skim milk retentate preferably has a non-fat milk solids content of from about 20 to about 30%. All percentages used herein are by weight based on the weight of the nonfat cream cheese product, and all temperatures are in ° F. unless otherwise indicated. The skim milk retentate is produced by ultrafiltration treatment in accordance with well known procedures. Dry cultured cottage cheese curd is a well known dairy product, which is a drained, uncreamed skim milk cheese curd made by inoculating skim milk with culture and allowing the product to coagulate. Dry cottage cheese curd may also be made by a direct acidification method. Generally, dry cottage cheese curd comprises about 17% to 26% by weight non-fat milk solids and 74% to 83% by weight water. When used herein, the term "dry cottage cheese curd" refers to a soft cheese curd such as cottage cheese or baker's cheese curd product having the above solids and moisture characteristics. Non-fat dry milk solids are produced by drying skim milk and usually have about 4% moisture.

The skim milk used to provide the dry cottage cheese curd may be subjected to well known heat treatment conditions to co-precipitate the serum proteins with that of skim milk. Such conditions are taught in U.S. Pat. No. 3,039,879 to Vakaleris.

Prior to use in the method of the present invention, the skim milk retentate produced by ultrafiltration is fermented to reduce the pH of the skim milk retentate. Fermentation with a lactic starter culture is a well known cheese making step. Preferably, fermentation of the skim milk retentate proceeds to a level such that a coagulum does not form, i.e., the fermentation process is stopped while the pH is above the isoelectric point and preferably the pH is at a level of from about 4.8 to 5.2. In this connection, the use of dry cottage cheese curd provides a bland flavor component which reduces the level of flavor produced by fermenting the retentate. Accordingly, when the dry curd cottage cheese is present in the non-fat cream cheese product at a level of from about 20% to about 50%, the pH of the retentate is preferably on the low side of the pH range, i.e., from about 4.8 to about 5.0 to provide more flavor. When dry curd cottage cheese is not used or is present at a level up to about 20%, the pH of the retentate is preferably on the higher side of the pH range, i.e., from about 5.0 to about 5.2.

The final fluid system of the present invention is a complex network of protein, both casein and serum protein and a particular gum system. The various components require introduction and mixing in a particular sequence to provide the highly desirable appearance, taste, consistency and texture of cream cheese resembling that of a fat-containing cream cheese, but containing substantially no fat.

The fermented skim milk retentate is transferred to a mixing tank provided with agitation means. The mixer is a type which imparts high shear and is preferably a blender type mixer, such as is manufactured by Bredo, Inc. and sold under the trade name Bredo ™. A Bredo mixer has a circular disk mounted on a rotating shaft. The circular disk is provided with a plurality of upstanding blades. The mixing action in this type of mixer is similar to that provided by a household blender. The fermented skim milk is recirculated through a recirculating loop including a conduit by means of a pump as it is being agitated. The conduit exits from the bottom of the mixing tank and extends to an outlet in the top of the mixing tank.

After the fermented retentate is added to the mixer, agitation and recirculation is started and the dry curd cottage cheese, if used, and an emulsifying salt are added to the retentate. Agitation and recirculation are continued until a homogeneous dispersion of the dry curd cottage cheese and emulsifying salts are obtained prior to the start of heating by steam injection. Agitation and recirculation for a period of from about 1 to about 5 minutes has been found to be sufficient. While not wishing to be bound by any theory, it is believed that the emulsifying salt serves two functions. It is believed that the emulsifying salts assists in processing the dry curd cottage cheese to break down the curd protein structure and provide a smooth homogeneous dispersion. It is also believed that the emulsifying salt serves to bind the calcium which is present in the retentate. If free calcium is present in the dispersion in any substantial amount when steam heating is started, a stringy pasta filata type curd is formed at least locally at the point of steam injection. Such stringy curd is highly undesirable.

Any of the emulsifying salts commonly used in the manufacture of process cheese can be used. Such emulsifying salts include monosodium phosphate, disodium phosphate, dipotassium phosphate, trisodium phosphate, sodium metaphosphate (sodium hexametaphosphate), sodium acid pyrophosphate, sodium tripolyphosphate, tetrasodium pyrophosphate, potassium citrate, calcium citrate, sodium aluminum phosphate, sodium citrate , sodium tartrate and sodium potassium tartrate. Since there is not any substantial level of fat present in the non-fat cream cheese product of the invention, the emulsifying salt is not present for the same purpose as it is used for in the manufacture of process cheese, i.e., to emulsify the fat and protein. Instead, the emulsifying salt is used as a curd processing agent and calcium binding agent as indicated hereinabove.

After a homogeneous dispersion is attained, the dispersion is heated by means of steam injection. A suitable type of steam injection device is described in U.S. Pat.

No. 4,112,131 to Bosy, et al. It has been determined that heating by steam injection is required to effect heating of the various components providing the non-fat cream cheese product of the present invention within the time constraints required after addition of the components.

In general, the remaining components which provide the non-fat cream cheese product of the present invention are added to the dispersion at particular temperatures while the dispersion is being heated to a temperature in the range of from about 165 F. to about 190° F. within a period of less than about 45 minutes.

Non-fat dry milk is added to the dispersion when the temperature of the dispersion is within the range of from about 70° F. to about 150° F., preferably while the temperature is within the range of from about 140° F. to about 150° F.

The xanthan gum, which is the first gum of the stabilizer system of the invention, is added to the dispersion after the temperature of the dispersion has increased to within the range of from about 140° F. to about 165° F., preferably after the temperature has been increased to within the range of from about 155° F. to about 165° F. After the dispersion has been heated to a temperature within the range of from about 165° F. to about 190° F., preferably within the range of from about 180° F. to about 190° F., the steam injection is stopped and salt, sugar and carrageenan, which is the second gum in the stabilizer system of the present invention, are added to the dispersion. A preservative may also be added if increased shelf life of the non-fat cream cheese is desired. Suitable preservatives include sorbic acid, benzoic acid, potassium sorbate, sodium benzoate and calcium propionate and mixtures thereof. The preservative, if used, is preferably added at a level of from about 0.05% to about 0.2% and is added at the same time as the salt, sugar and carrageenan.

The use of both xanthan gum and carrageenan as a stabilizer system at particular levels and ratio is important to provide the structural and organoleptic properties of the invention. The xanthan gum is used at a level of from about 0.2% to about 0.4%. Carrageenan is used at a level of from about 0.05% to about 0.3%. The ratio of the level of use of the xanthan gum to the level of use of carrageenan is preferably in the range of from about 1.5:1 to about 4:1 by weight. If the level of xanthan gum is too high, the product produced is too firm. If the level of xanthan gum is too low, the product has the consistency of sour cream. If the level of carrageenan is too low, the product has undesirable cut properties. If the level of carrageenan is too high, the product has a gummy consistency.

After the last components of the non-fat cream cheese product have been added to the dispersion while the dispersion is at a temperature in the range of about 165° F. to about 190° F., steam injection is stopped. Agitation is continued for an additional period of from about 1 to about 5 minutes, and the mixture is transferred through a conventional homogenizer, such as a Gaulin homogenizer and is homogenized at about 5,000 psig, single stage to provide a non-fat cream cheese product.

After homogenization, the non-fat cream cheese product has an aerated texture. The non-fat cream cheese product is then subjected to a deaeration step in a vacuum deaerator prior to packaging to provide a firm non-aerated product.

While the cream cheese product of the present invention is characterized as being a non-fat product, from a practical standpoint, it is impossible to remove all butterfat from milk in ordinary commercial cream separation process. Usually, a few tenths of a percent of butterfat remains in the skim milk after separating cream from the milk in the most efficient separators, i.e., skim milk usually has from about 0.05% to about 0.5% of fat. When the skim milk is further concentrated, such as by providing a skim milk retentate or dry curd cottage cheese, the butterfat content is increased in proportion to the degree of concentration. Accordingly, the non-fat cream cheese product of the present invention has from about 0.05% to about 1.5% butterfat in the final cream cheese product.

The non-fat cream cheese product of the present invention has from about 40% to about 80% of skim milk retentate. The skim milk retentate has from about 20% to about 30% solids. Dry curd cottage cheese is present in the non-fat cream cheese product at a level of from 0% to about 50%, preferably from about 20% to about 45%. Dry curd cottage cheese generally has a solids content of from about 20% to about 23%. The emulsifying salt is present in the non-fat cream cheese product at a level of from about 0.8% to about 1.2%. Non-fat dry milk is present in the non-fat cream cheese product at a level of from about 2% to about 4%. Non-fat dry milk generally has a solids content of from about 95% to about 97%. Salt is present at a level of from about 0.4% to about 0.8%, and sugar is present at a level of from about 0.7% to about 1.1%. Additionally, vitamins and spices may optionally be present at minor levels in the non-fat cream cheese product.

The non-fat cream cheese product of the invention has from about 23% to about 26% of total solids and from about 14% to about 18% of protein.

The following example further illustrates various features of the present invention, but is intended to in no way limit the scope of the invention, which is defined in the appended claims.

EXAMPLE 1

A non-fat cream cheese product is prepared in accordance with the method of the invention containing the following ingredients at the indicated levels:

TABLE 1

| Ingredient | Percentage As Is | Percent Solids |
|---|---|---|
| UF concentrated skim milk | 48.5 | 11.9 |
| Dry curd cottage cheese | 32.3 | 7.0 |
| Water/Steam | 13.2 | 0 |
| Non-fat dry milk | 2.7 | 2.6 |
| Sodium Tripolyphosphate | 0.9 | 0.9 |
| Salt | 0.55 | 0.5 |
| Sugar | 0.82 | 0.8 |
| Titanium Dioxide | 0.46 | 0.5 |
| Xanthan Gum | 0.27 | 0.3 |
| Kappa Carrageenan (GP911) | 0.09 | 0.9 |
| Potassium Sorbate | 0.06 | 0.06 |
| Calcium Propionate | 0.05 | 0.05 |
| Starter Culture | 0.025 | 0 |
| Vitamin A Palmitate | 0.016 | 0 |
| Oleoresin Paprika | 0.001 | 0 |
| Total Solids | | 24.70 |

The skim milk retentate was retained in a holding tank at a temperature of 72° F. The retentate was inoculated with a culture of S. lactis and was fermented for a time of 16 hours until a pH of 5.0 was reached. 969.5 pounds of the fermented skim milk retentate were then transferred to a Bredo mixer having a capacity of 300 gallons. The mixer was turned on and 646.7 pounds of dry curd cottage cheese at a temperature of 40° F. was added to the mixer. 18.24 pounds of tripolyphosphate was added to the mixer and agitation and recirculation through a recirculation loop was continued for three minutes. At this time, steam at a pressure of 45 psig was injected into the recirculating loop. After reaching a temperature of 145° F., 54.76 pounds of non-fat dry milk was added. After reaching a temperature of 160° F., 5.48 pounds of xanthan gum was added. After reaching a temperature of 187° F., steam injection was stopped and 10.96 pounds of salt, 16.42 pounds of sugar, 9.14 pounds of titanium dioxide, 1.16 pounds of potassium sorbate, 0.92 pounds of calcium propionate, 1.8 pounds of carrageenan, 0.32 pounds of Vitamin A palmitate and 0.02 pounds of oleoresin paprika was added. Agitation of the mixture was continued for a total of 3 minutes.

The non-fat cream cheese mix resulting from the sequence of heating and addition steps described hereinabove, was then homogenized in a Gaulin homogenizer at a pressure of 5,000 psig. After homogenization, the non-fat cream cheese product was transferred through a vacuum deaerator and was filled into suitable size packages. The resulting non-fat cream cheese product had the characteristics, mouthfeel and organoleptic properties of a cream cheese product that contains a substantial level of fat.

What is claimed is:

1. A method for making a non-fat cream cheese product comprising
   introducing a cultured skim milk retentate having a pH of from about 4.8 to about 5.2 into a mixing tank provided with agitation means,
   adding an emulsifying salt and optionally adding dry cottage cheese curd to said mixing tank and agitating said retentate for a first predetermined time period of from about 1 to about 5 minutes to provide a dispersion,
   agitating said dispersion and recirculating said dispersion through a recirculating loop while injecting steam into said dispersion,
   adding non-fat dry milk to said mixing tank at a first predetermined temperature of from about 70° F. to about 150° F., adding xanthan gum as the first gum of a gum system to said mixing tank at a second predetermined temperature of from about 140° F. to about 165° F.,
   heating said dispersion to a third predetermined temperature of from about 165° F. to about 190° F. and stopping said steam injection,
   adding salt, sugar and carrageenan, as the second gum of said gum system, to said mixing tank,
   continuing said agitation for a second predetermined time period of from about 1 to about 5 minutes,
   homogenizing said non-fat cream cheese mix to provide a non-fat cream cheese product,
   said xanthan gum being present at a level of from about 0.2% to about 0.4%, said carrageenan being present at a level of from about 0.05% to about 0.3% and the ratio of the level of use of the xanthan gum to the level of use of carrageenan is in the range of from about 1.5:1 to about 4:1 by weight, said skim milk retentate being present at a level of from about 40% to about 80%, said dry curd cottage cheese being present at a level of from 0% to about 50%, said emulsifying salt being present at a level of from about 0.8% to about 1.2%, said non-fat dry milk being present at a level of from about 0.4% to about 0.8% and said sugar being present at a level of from about 0.7% to about 1.1%.

2. A method in accordance with claim 1 wherein said non-fat cream cheese product has from about 23% to about 26% of total solids and from about 14% to about 18% of protein and has less than about 1.5% butterfat.

3. A method in accordance with claim 1 wherein a preservative is added while said dispersion is at a temperature of from about 180° F. to about 190° F.

4. A method in accordance with claim 3 wherein said preservative is selected from the group consisting of sorbic acid, benzoic acid, potassium sorbate, sodium benzoate and calcium propionate and mixtures thereof.

* * * * *